UNITED STATES PATENT OFFICE.

CARL SCHEIBLER, OF BERLIN, GERMANY.

PROCESS OF MANUFACTURING SUGAR.

SPECIFICATION forming part of Letters Patent No. 261,958, dated August 1, 1882.

Application filed March 21, 1882. (No specimens.) Patented in Belgium March 4, 1882, No. 57,239; in France March 4, 1882, No. 147,715; in England March 4, 1882, No. 1,057; in Luxemburg March 12, 1882, No. 187, and in Italy March 31, 1882, XXVIII, 212.

*To all whom it may concern:*

Be it known that I, CARL SCHEIBLER, doctor of philosophy, subject of the king of Prussia, residing at Berlin, Prussia, German Empire, have invented certain new and useful Improvements in the Process of Manufacturing Sugar; and I do hereby declare the following to be a full, clear, and exact description of the invention, such as will enable others skilled in the art to which it appertains to make and use the same.

In my applications for patent for improvements in the manufacture of sugar, filed on or about February 23 and March 3, 1882, I have described processes for the separation of sugar from molasses or sirups or from plant juices by means of caustic strontium or strontium saccharate, and the recovery of the strontium from the precipitates or impurities by the calcination of the latter in order to convert the strontium contained therein into caustic strontium for further use. I have found, however, that I proceed more economically when the saccharine solutions referred to are first freed from the major part of the organic and inorganic non-sugary bodies before treating them with strontium saccharate or caustic strontium. By this new process of treatment I not only obtain equally as good results in the percentage of sugar obtained, but I also obtain a by-product which renders this process more economical in so far as the recovery of the non-sugary organic and inorganic bodies is concerned, which are lost in the burning or calcining of the precipitates to recover the strontium combined therewith, when such solutions are treated with strontium or strontium saccharate only, as described in the applications above referred to, and which by-product may be made available for use as a valuable fertilizer.

My present invention therefore consists in first treating the saccharine solutions with caustic lime in the usual manner, and after precipitation or filtration, or both, I treat the said saccharine solutions, freed from all such organic and inorganic non-sugary bodies as will combine with the lime, with strontium saccharate or with caustic strontium, as hereinafter more fully described.

In carrying out my invention I first treat the saccharine solution with caustic lime in the usual manner, in order to eliminate therefrom all the non-sugary organic and inorganic bodies that will combine with the lime. I then recover the organic and inorganic non-sugary bodies, together with the lime, by passing the solution through a filter-press, or otherwise filter the same, and, finally, I treat the saccharine solution freed from such organic and inorganic non-sugary bodies as will combine with the lime preferably with fluid saccharate of strontium in excess. The purified saccharine juices or solutions may also be treated with solid strontium saccharate, which is introduced into the heated saccharine solution while the latter is kept agitated, whereby it is dissolved. The precipitate or non-sugary bodies, combined with the strontium obtained, are then burned or calcined in order to recover therefrom the strontium in the form of caustic strontium, which is available for further use. A further advantage resulting from the treatment of saccharine solutions first with lime and next with strontium consists in the fact that the strontium precipitate is practically free from phosphoric acid, iron, manganese, &c., which latter combine and are removed with the lime precipitate. The subsequent process of recovering the strontium in the form of caustic strontium is therefore greatly facilitated and more readily effected than the recovery thereof from the organic and inorganic non-sugary bodies separated from saccharine juices by treating them with strontium or strontium saccharate only.

Having now described my invention, what I claim is—

The process of obtaining sugar from saccharine juices or solutions, which consists in treating the same with caustic lime in the usual manner, removing therefrom the organic and inorganic non-sugary bodies that combine with the lime, and finally treating the juices or solutions with strontium saccharate or caustic strontium, substantially as and for the purposes specified.

In testimony whereof I affix my signature in presence of two witnesses.

CARL SCHEIBLER.

Witnesses:
GEORGE LOUBIER,
B. ROI.